United States Patent
Kim et al.

(10) Patent No.: US 10,630,368 B2
(45) Date of Patent: Apr. 21, 2020

(54) METHOD AND DEVICE FOR SUPPORTING MULTI-USER MULTI-STREAM IN WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Heejin Kim, Seoul (KR); Kyungjun Choi, Seoul (KR); Kwang Soon Kim, Seoul (KR); Jiwon Kang, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 313 days.

(21) Appl. No.: 15/735,075

(22) PCT Filed: Nov. 9, 2015

(86) PCT No.: PCT/KR2015/011993
§ 371 (c)(1),
(2) Date: Dec. 8, 2017

(87) PCT Pub. No.: WO2016/199988
PCT Pub. Date: Dec. 15, 2016

(65) Prior Publication Data
US 2020/0036426 A1    Jan. 30, 2020

Related U.S. Application Data

(60) Provisional application No. 62/173,965, filed on Jun. 11, 2015.

(51) Int. Cl.
*H04B 7/02* (2018.01)
*H04B 7/06* (2006.01)
(Continued)

(52) U.S. Cl.
CPC ......... *H04B 7/0695* (2013.01); *H04B 7/0452* (2013.01); *H04B 7/0617* (2013.01);
(Continued)

(58) Field of Classification Search
CPC .. H04B 7/0695; H04B 7/0626; H04B 7/0452; H04B 7/0617; H04L 5/0035; H04L 25/0224; H04W 72/046
(Continued)

(56) References Cited

U.S. PATENT DOCUMENTS

2015/0333878 A1* 11/2015 Yu .................... H04L 1/1893
370/329
2015/0358064 A1* 12/2015 Benjebbour ......... H04B 7/0452
370/329

(Continued)

FOREIGN PATENT DOCUMENTS

JP        2014131201        7/2014
KR    1020140125643       10/2014

OTHER PUBLICATIONS

PCT International Application No. PCT/KR2015/011993, Written Opinion of the International Searching Authority dated Mar. 10, 2016, 16 pages.

(Continued)

*Primary Examiner* — Don N Vo
(74) *Attorney, Agent, or Firm* — Lee, Hong, Degerman, Kang & Waimey PC

(57) ABSTRACT

The present application provides a method for a multi-user multi-stream supporting base station transmitting a signal to a terminal. The method comprising: estimating channel information of a first terminal by receiving a reference signal from the first terminal; and by using the estimated channel information, transmitting a plurality of beams to the first terminal based on a non-orthogonal multiple access scheme.

(Continued)

When transmitting the plurality of beams to the first terminal based on the non-orthogonal multiple access scheme, a plurality of virtual terminals of the first terminal are generated, and a signal for a first virtual terminal among the plurality of virtual terminals are allocated to a first beam and transmitted, and a signal for a second virtual terminal among the plurality of virtual terminals are allocated to a second beam and transmitted.

15 Claims, 16 Drawing Sheets

(51) Int. Cl.
    *H04B 7/0452*     (2017.01)
    *H04W 72/04*     (2009.01)
    *H04L 5/00*     (2006.01)
    *H04L 25/02*     (2006.01)

(52) U.S. Cl.
    CPC ......... *H04B 7/0626* (2013.01); *H04L 5/0035* (2013.01); *H04L 25/0224* (2013.01); *H04W 72/046* (2013.01)

(58) Field of Classification Search
    USPC .................................................. 375/262, 267
    See application file for complete search history.

(56) References Cited

U.S. PATENT DOCUMENTS

2018/0091273 A1*   3/2018   Choi ......................... H04L 5/00
2018/0092075 A1*   3/2018   Kim ...................... H04W 24/10

OTHER PUBLICATIONS

NTT DOCOMO, "Candidate non-orthogonal multiplexing access scheme", 3GPP TSG RAN WG1 Meeting #81, R1-153333, May 2015, 7 pages.

Qualcomm, "Multiuser superposition schemes", 3GP TSG RAN WG1 Meeting #81, R1-152806, May 2015, 4 pages.

Huawei et al., "Candidate schemes for superposition transmission", 3GPP TSG RAN WG1 Meeting #81, R1-152493, May 2015, 11 pages.

* cited by examiner

FIG. 6
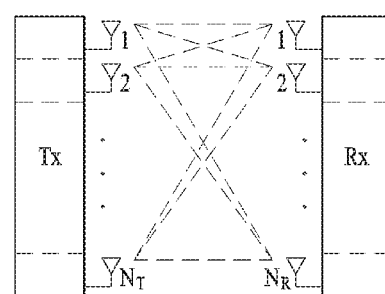
(a)
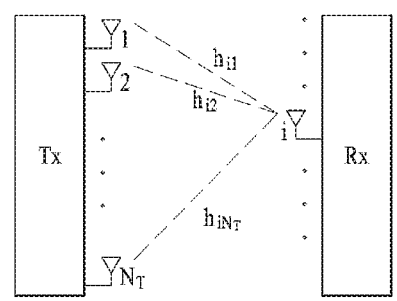
(b)

FIG. 7
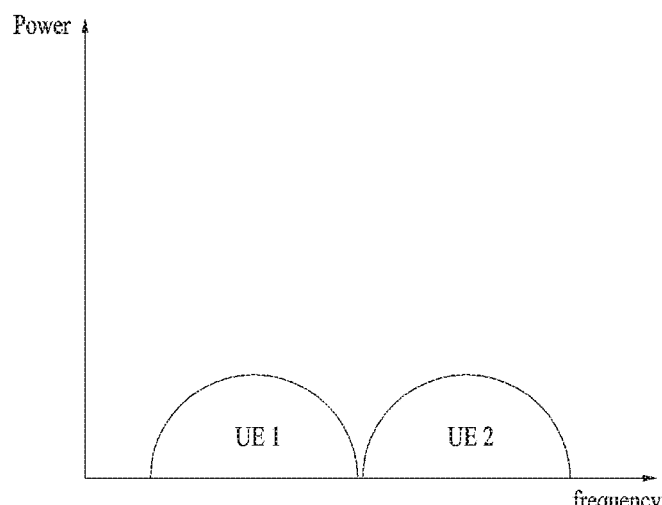
(a) OFDMA
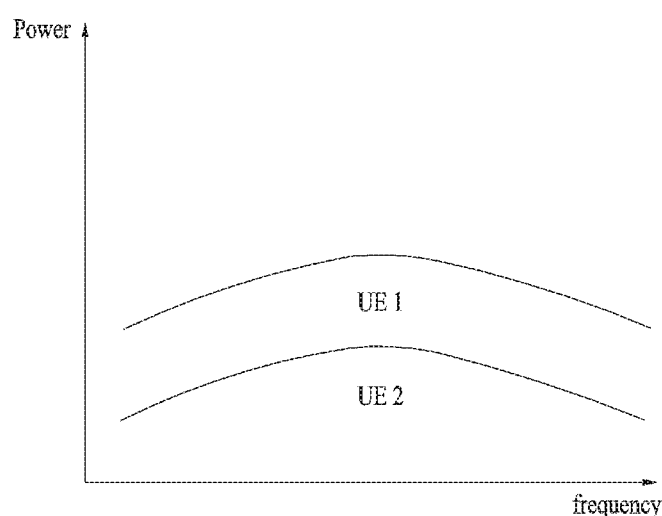
(b) NOMA

FIG. 12

$$H_{A,1} = t_1 H_A \in \mathbb{C}^{1 \times L}$$
Vitrual User A1

$$H_A \in \mathbb{C}^{M \times L} \implies H_{A,2} = t_2 H_A \in \mathbb{C}^{1 \times L}$$

User A      Vitrual User A2

$$H_{A,Q} = t_Q H_A \in \mathbb{C}^{1 \times L}$$
Vitrual User AQ

FIG. 13
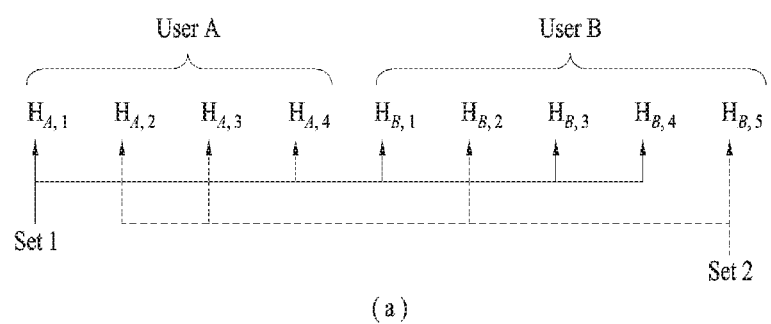
(a)
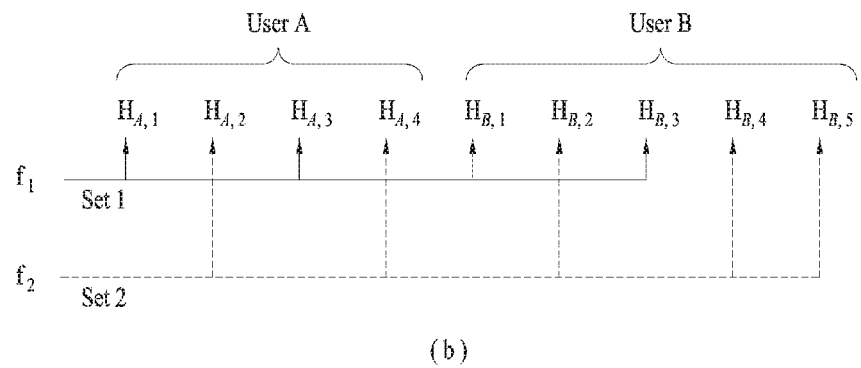
(b)

METHOD AND DEVICE FOR SUPPORTING MULTI-USER MULTI-STREAM IN WIRELESS COMMUNICATION SYSTEM

CROSS-REFERENCE TO RELATED APPLICATIONS

This application is the National Stage filing under 35 U.S.C. 371 of International Application No. PCT/KR2015/011993, filed on Nov. 9, 2015, which claims the benefit of U.S. Provisional Application No. 62/173,965, filed on Jun. 11, 2015, the contents of which are all hereby incorporated by reference herein in their entirety.

TECHNICAL FIELD

The present invention relates to a wireless communication system, and more particularly, to a method and device for supporting multi-user multi-stream transmission based on non-orthogonal multiple access (NOMA).

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

Although radio communication technology has been developed up to LTE based on WCDMA, demands and expectations of users and providers continue to increase.

DISCLOSURE OF THE INVENTION

Technical Task

An object of the present invention is to provide a method and device for transmitting and receiving signals based on NOMA in a wireless communication system.

Another object of the present invention is to provide a method for providing a user with multiple streams using multiple beams in a wireless communication system.

A further object of the present invention is to provide a method for transmitting and receiving signals using virtual user equipments for a specific user equipment in a wireless communication system.

Technical Solutions

The object of the present invention can be achieved by providing a method of transmitting a signal to a user equipment (UE) by a base station (BS) supporting multi-user multi-stream, the method comprising: estimating channel information for a first UE by receiving a reference signal from the first UE; and transmitting a plurality of beams to the first UE using the estimated channel information based on a non-orthogonal multiple access (NOMA) scheme, wherein a plurality of virtual UEs for the first UE are generated when the plurality of beams are transmitted to the first UE based on the NOMA scheme, and wherein a signal for a first virtual UE among the plurality of virtual UEs is allocated to a first beam and then transmitted and a signal for a second virtual UE among the plurality of virtual UE is allocated to a second beam and then transmitted.

In another aspect of the present invention, provided herein is a base station (BS) device supporting multi-user multi-stream, the BS device comprising: a reception module configured to receive information from an external device; a transmitting module configured to transmit information to the external device; and a processor controlling the receiving and transmitting modules, wherein the processor is configured to: estimate channel information for a first user equipment (UE) by receiving a reference signal from the first UE; and transmit a plurality of beams to the first UE using the estimated channel information based on a non-orthogonal multiple access (NOMA) scheme, wherein a plurality of virtual UEs for the first UE are generated when the plurality of beams are transmitted to the first UE based on the NOMA scheme, and wherein a signal for a first virtual UE among the plurality of virtual UEs is allocated to a first beam and then transmitted and a signal for a second virtual UE among the plurality of virtual UE is allocated to a second beam and then transmitted.

In addition, the following matters are commonly applicable to the method of transmitting a signal to the UE by the BS supporting multi-user multi-stream, and the UE and BS in the wireless communication system.

In one embodiment of the present invention, the first virtual UE is included in a first virtual UE set and the first beam is a transmission beam corresponding to the first virtual UE set, and wherein the second virtual UE is included in a second virtual UE set and the second beam is a transmission beam corresponding to the second virtual UE set.

In one embodiment of the present invention, further comprising: estimating a channel for a second UE by receiving a reference signal from the second UE; and transmitting the plurality of beams to the second UE using the estimated channel based on the NOMA scheme, wherein a plurality of virtual UEs for the second UE are generated when the plurality of beams are transmitted to the second UE based on the NOMA scheme, wherein a third virtual UE among the plurality of virtual UEs for the second UE is included in the first virtual UE set and a signal for the third virtual UE is further allocated to the first beam and then transmitted, and wherein a fourth virtual UE among the plurality of virtual UEs for the second UE is included in the second virtual UE set and a signal for the fourth virtual UE is further allocated to the second beam and then transmitted.

In one embodiment of the present invention, virtual UEs included in one virtual UE set are virtual UEs having channel similarity equal to or lower than a first threshold.

In one embodiment of the present invention, further comprising generating representative vectors for the virtual UE sets, respectively. In one embodiment of the present invention, further comprising generating a beamforming precoder using the representative vectors, wherein the beamforming precoder is a precoder for cancelling interference associated with virtual UEs included in each virtual UE set.

In one embodiment of the present invention, further comprising feeding back, to the first UE, allocation information for the first and second virtual UEs.

In one embodiment of the present invention, further comprising measuring second-order characteristics of a channel. When the second-order characteristics of the channel is measured, the plurality of beams are transmitted to the first UE using the channel information estimated from the reference signal together with the measured second-order characteristics of the channel based on the NOMA scheme.

In one embodiment of the present invention, when the plurality of beams are transmitted to the first UE based on the NOMA scheme, the first and second beams are first generated based on the measured second-order characteristics of the channel, and then based on characteristics of the generated first and second beams, the first virtual UE is allocated to the first beam and the second virtual UE is allocated to the second beam.

Advantageous Effects

According to the present invention, it is possible to provide a method and device for transmitting and receiving signals based on NOMA in a wireless communication system.

According to the present invention, it is possible to provide a method for providing a user with multiple streams using multiple beams in a wireless communication system.

According to the present invention, it is possible to provide a method for transmitting and receiving signals using virtual user equipments for a specific user equipment in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

FIG. 6 is a diagram illustrating a configuration of a wireless communication system having multiple antennas.

FIG. 7 is a diagram illustrating a method for allocating resources based on a NOMA scheme.

FIG. 12 is a diagram illustrating a method for generating virtual user equipments.

FIG. 13 is a diagram illustrating a method for generating a virtual user equipment set.

BEST MODE FOR INVENTION

Figure 1:
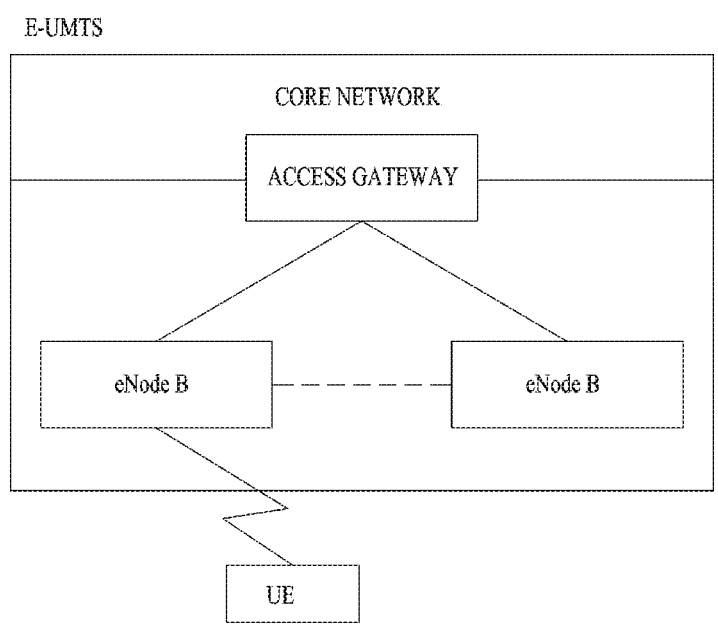
FIG. 1 is a schematic diagram illustrating the E-UMTS network structure as an example of a wireless communication system.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment or may be replaced by corresponding elements or features of another embodiment.

The embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

Figure 2:
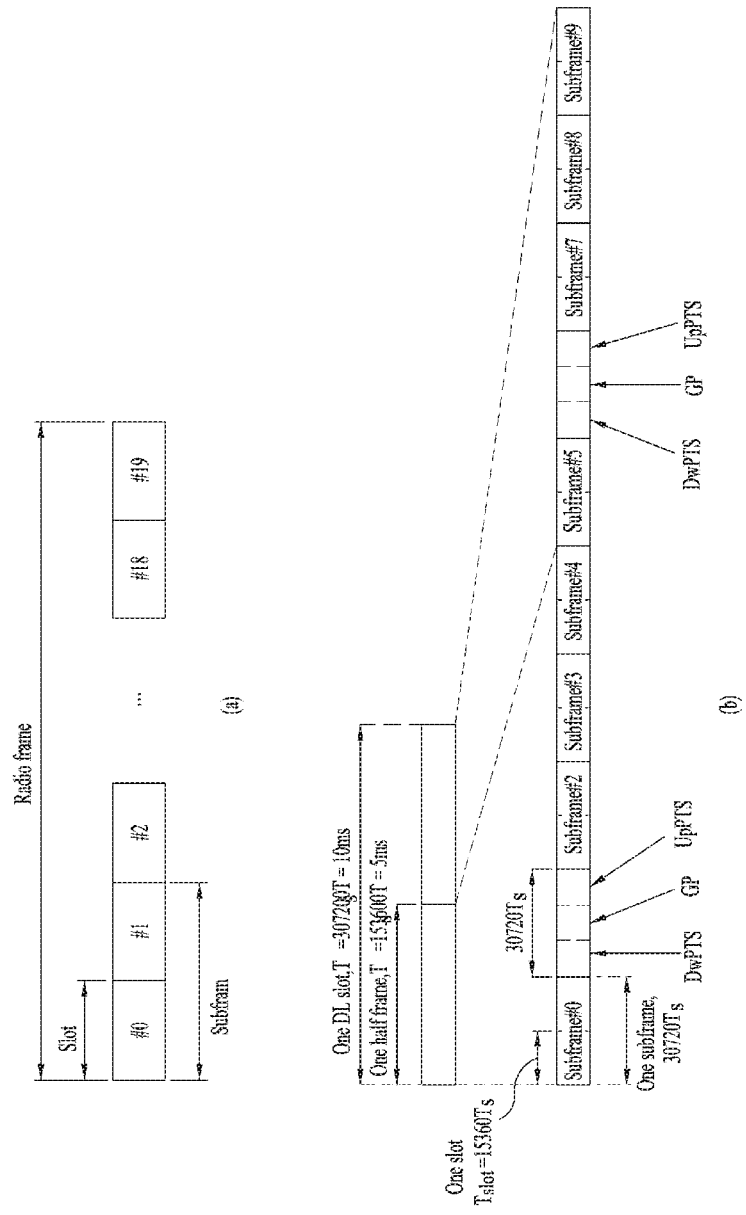
FIG. 2 is a diagram for explaining the structure of a radio frame.

FIG. 2 is a diagram for explaining a structure of a radio frame.

In a cellular OFDM wireless packet communication system, an uplink/downlink data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 2(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration, and one slot may be 0.5 ms in duration. A slot may include a plurality of orthogonal frequency division multiplexing (OFDM) symbols in the time domain and includes a plurality of resource blocks (RBs) in the frequency domain. Since the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of consecutive subcarriers in a slot.

The number of OFDM symbols included in one slot may be changed according to the configuration of a Cyclic Prefix (CP). The CP includes an extended CP and a normal CP. For example, if the OFDM symbols are configured with the normal CP, the number of OFDM symbols included in one slot may be seven. If the OFDM symbols are configured with the extended CP, the length of one OFDM symbol is increased, and thus the number of OFDM symbols included in one slot is less than that of the case of the normal CP. In the case of the extended CP, for example, the number of OFDM symbols included in one slot may be six. If a channel state is instable, for example, if a UE moves at a high speed, the extended CP may be used to further reduce interference between symbols.

When the normal CP is used, one subframe includes 14 OFDM symbols because one slot includes seven OFDM symbols. At this time, the first two or three OFDM symbols of each subframe may be allocated for a Physical Downlink Control Channel (PDCCH) and the remaining OFDM symbols may be allocated for a Physical Downlink Shared Channel (PDSCH).

FIG. 2(b) illustrates the type-2 radio frame structure. The type-2 radio frame includes two half frames, each of which has 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at a BS. The GP is a period between an uplink and a downlink, which eliminates uplink interference caused by multipath delay of a downlink signal. Meanwhile, one subframe includes two slots irrespective of the type of a radio frame.

The above-described radio frame structures are merely exemplary, and thus it should be noted that the number of subframes in a radio frame, the number of slots in a subframe, or the number of symbols in a slot may vary.

Figure 3:
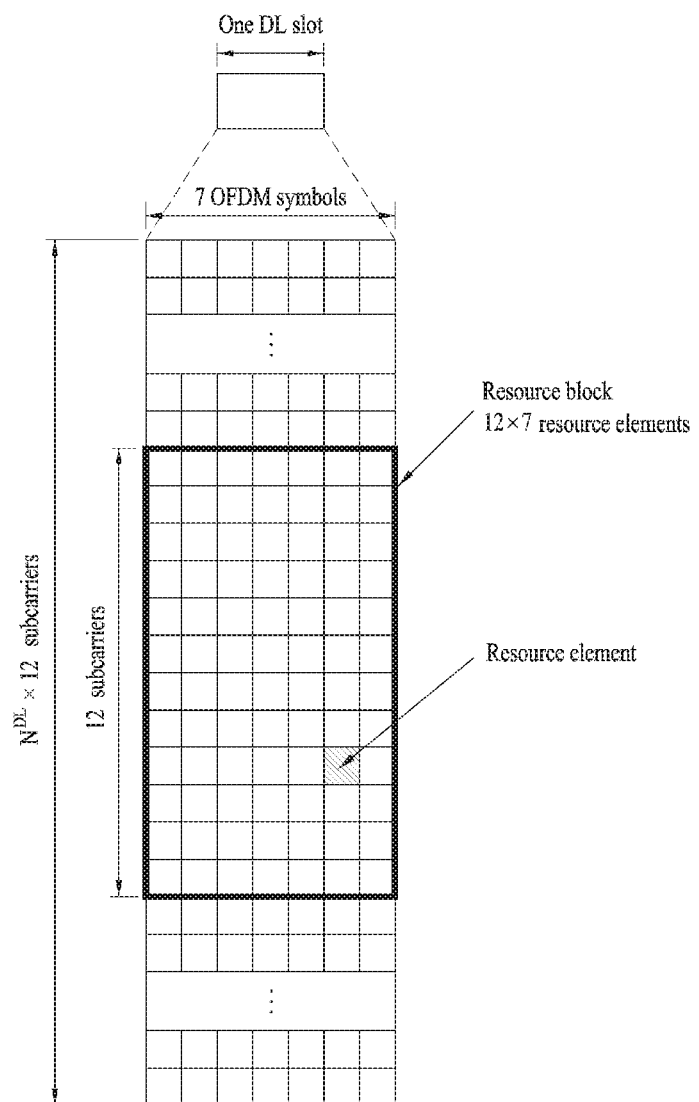
FIG. 3 is a diagram illustrating a resource grid for a downlink slot.

FIG. 3 is a diagram illustrating a resource grid for a downlink slot.

A downlink slot includes 7 OFDM symbols in the time domain, and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 4:
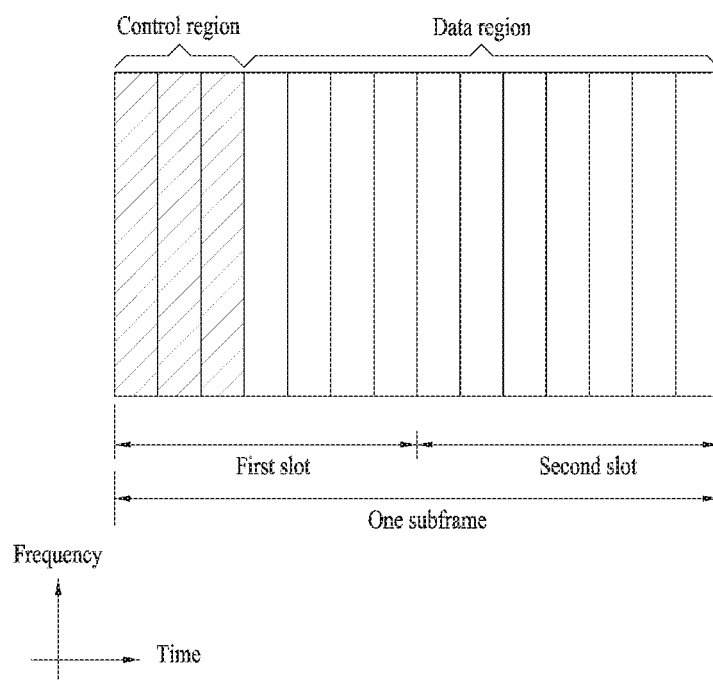
FIG. 4 is a diagram illustrating the structure of a downlink subframe.

FIG. 4 is a diagram illustrating a downlink subframe structure.

A maximum of three OFDM symbols located in a front portion of the first slot in a downlink subframe corresponds to a control region to which control channels are allocated, and the remaining OFDM symbols of the downlink subframe corresponds to a data region to which a PDSCH is allocated.

Examples of downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is transmitted in the first OFDM symbol of a subframe and carries information on the number of OFDM symbols used for transmission of control channels in the subframe. The PHICH carries an HARQ ACKnowledgment/Negative ACKnowledgment (ACK/NACK) signal in response to uplink transmission. Control information carried on the PDCCH is called Downlink Control Information (DCI). The DCI includes uplink or downlink scheduling information or uplink transmission power control commands for UE groups. The PDCCH carries information on resource allocation and a transport format for a Downlink Shared CHannel (DL-SCH), resource allocation information on an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region, and a UE may monitor a plurality of PDCCHs.

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to correlation between the number of CCEs and the coding rate provided by the CCEs.

A BS determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information (particularly, a System Information Block (SIB)), its CRC may be masked by a system information ID and a System Information RNTI (SI-RNTI). To indicate that the PDCCH carries a random access response in response to a random access preamble transmitted by a UE, its CRC may be masked by a Random Access-RNTI (RA-RNTI).

Figure 5:
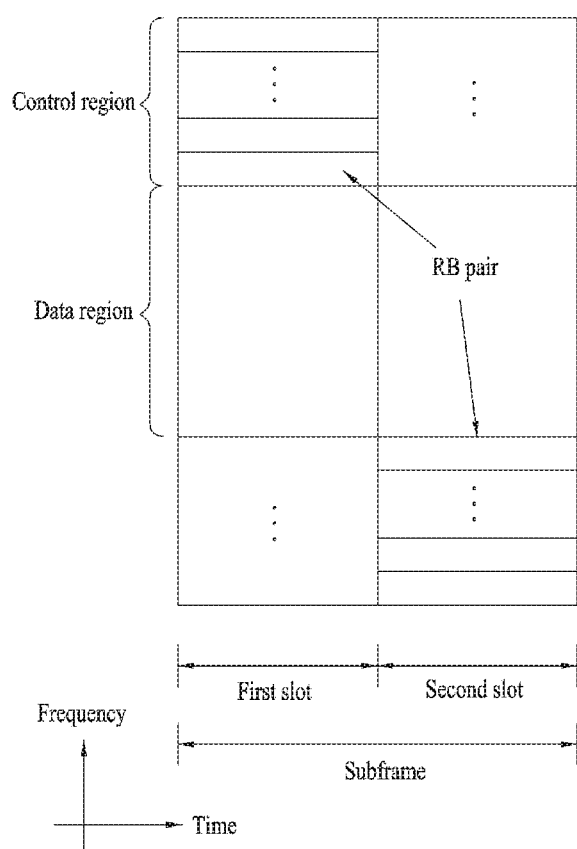
FIG. 5 is a diagram illustrating the structure of an uplink subframe.

FIG. 5 is a diagram illustrating an uplink subframe structure.

An uplink subframe may be divided into a control region and a data region in the frequency domain. A Physical Uplink Control CHannel (PUCCH) carrying uplink control information is allocated to the control region, and a Physical Uplink Shared Channel (PUSCH) carrying user data is allocated to the data region. To maintain the property of a single carrier, a UE does not simultaneously transmit a PUSCH and a PUCCH. A PUCCH for a UE is allocated to an RB pair in a subframe. The RBs of the RB pair occupy different subcarriers in two slots. Thus, it is said that the RB pair allocated to the PUCCH is frequency-hopped over a slot boundary.

Modeling of Multiple Input Multiple Output (MIMO) System

FIG. 6 is a diagram illustrating a configuration of a wireless communication system having multiple antennas.

Referring to FIG. 6(a), when the number of Transmission (Tx) antennas and the number of Reception (Rx) antennas are increased to NT and NR, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate Ro that may be achieved in case of a single antenna and a rate increase rate Ri.

$$R_i = \min(N_T, N_R) \quad \text{[Equation 1]}$$

For instance, assuming that a MIMO communication system uses 4 Tx antennas and 4 Rx antennas, the MIMO system can theoretically acquire a high transfer rate which is four times higher than that of a single antenna system. After this theoretical capacity increase of the MIMO system has been proved in the middle of 90's, many ongoing efforts are made to various techniques to substantially improve a data transmission rate. Some of the above technologies have been reflected in a variety of wireless communication standards, for example, third-generation mobile communication or next-generation wireless LAN, etc.

The trends for the MIMO relevant studies are as follows. First, many ongoing efforts are made in various aspects to develop and research information theory study relevant to MIMO communication capacity calculations in various channel configurations and multiple access environments, radio channel measurement and model derivation study for MIMO systems, spatiotemporal signal processing technique study for transmission reliability enhancement and transmission rate improvement, etc.

Communication in the MIMO system will be described in detail through mathematical modeling. It is assumed that there are NT Tx antennas and NR Rx antennas as illustrated in FIG. 7. Since up to NT pieces of information can be transmitted through the NT Tx antennas, a transmission signal can be expressed as a vector in Equation 2.

$$S = [S_1, S_2, \ldots, S_{N_T}]^T \quad \text{[Equation 2]}$$

Meanwhile, a different transmit power may be applied to each piece of transmission information, $S_1, S_2, \ldots, S_{N_T}$. If transmit powers are set to $P_1, P_2, \ldots, P_{N_T}$, respectively, the transmission information with adjusted transmit powers can be represented as a vector in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, ŝ can be expressed as shown in Equation 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming that $N_T$ transmitted signals $x_1, x_2, \ldots, x_T$, which will be actually transmitted, are configured by applying a weight matrix W to the information vector $\hat{s}$ having the adjusted transmit powers, the weight matrix serves to appropriately distribute the transmission information to each antenna according to a transport channel state. The transmitted signals, $x_1, x_2, \ldots, x_T$ can be expressed as shown in Equation 5 using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, $W_{ij}$ denotes a weight between an $i^{th}$ Tx antenna and $j^{th}$ information, and W is also called a precoding matrix.

If the NR Rx antennas are present, respective received signals $y_1, y_2, \ldots, y_{N_R}$ of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 6(b) is a diagram illustrating channels from the NT Tx antennas to the Rx antenna i. The channels may be combined and expressed in the form of a vector and a matrix. In FIG. 6(b), the channels from the NT Tx antennas to the Rx antenna i can be expressed as follows.

$$h_i^T = [h_{i1}, h_{i2}, \ldots, h_{iN_T}] \qquad \text{[Equation 7]}$$

Accordingly, all channels from the NT Tx antennas to the NR Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \qquad \text{[Equation 8]}$$

An AWGN (Additive White Gaussian Noise) is added to the actual channels after a channel matrix H. The AWGN $n_1$, $n_2, \ldots, n_{N_R}$ respectively added to the NR receive antennas can be expressed as follows.

$$n = [n_1, n_2, \ldots, n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \qquad \text{[Equation 10]}$$

$$\begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of Tx and Rx antennas. The number of rows of the channel matrix H is equal to the number NR of Rx antennas, and the number of columns thereof is equal to the number NR of Tx antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank (rank(H)) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this specification, 'rank' in the MIMO transmission represents the number of paths through which signals can be independently transmitted on a specific frequency resource at a specific time and 'the number of layers' refers to the number of signal streams transmitted through each path. Since a transmitter transmits as many layers as the number of ranks used for signal transmission, the rank corresponds to the number of layers unless otherwise mentioned.

FIG. 7 is a diagram illustrating a method for allocating resources based on a NOMA scheme.

In the cellular system, a BS may use multiple antennas to improve the frequency efficiency as described above. To this end, a technology of increasing the number of antennas used by the BS has been proposed. This technology is called massive MIMO. According to the technology, since sharp beams are transmitted to multiple users based on spatial degrees of freedom obtained from the multiple antennas, high reception power and low interference power can be provided. For example, when the number of Tx antennas and the number of users are M and K, respectively and when a channel is independent identically distributed (i.i.d.) Rayleigh fading, total available transmission capacity can be expressed as min{M,K} log 2 SNR. That is, the transmission capacity can be linearly increased in proportion to the value of min{M,K}.

However, when values of M and K increase, a complicate transmission and reception scheme is required to obtain corresponding transmission capacity. For example, when the values of M and K increase, the BS needs to use dirty-paper coding (DPC) for downlink transmission and a joint maximum-likelihood (JML) receiver for transmission link reception to obtain the transmission capacity. In addition, the calculation complexity of these two schemes may be exponentially increased in accordance with the number of antennas and the number of users. That is, in this case, the system may not operate due to hardware complexity limitation, delay time limitation, hardware power limitation, and the like resulting from the calculation complexity.

Therefore, a sub-optimal transmission scheme with low calculation complexity should be used in the actual system. Examples of the sub-optimal transmission scheme include an orthogonal multiple access scheme and a non-orthogonal multiple access (NOMA) scheme.

According to the orthogonal multiple access scheme, independent resources are allocated to each UE to mitigate interference between UEs. The orthogonal multiple access scheme can be categorized as a frequency division multiple access scheme where frequency resources are distributed to individual UEs, a time division multiple access scheme where time resources are distributed to individual UEs, and a space division multiple access scheme where space resources are distributed to individual UEs. This scheme has advantages in that signals from UEs can easily modulated and demodulated because given resources are allocated for a single UE. As described above, the orthogonal multiple access scheme has been mainly used in the LTE and LTE-A systems.

However, the orthogonal multiple access scheme has low transmission capacity compared to the aforementioned DPC and JML. Thus, to increase the transmission capacity of the orthogonal multiple access scheme, zero-forcing beamforming, which is a simple beamforming method, has been used together with UE scheduling. In this case, by selecting and informing UEs configured to prevent performance degradation caused by zero-forcing beamforming, it is possible to provide performance similar to that of the DPC. However, in this method, channel information of UEs should be known in advance for scheduling the UEs, and thus there may be a problem that resources occupied by uplink reference signals for obtaining the UEs' channel information are increased. In addition, UE scheduling may be efficient when the number of UEs in a cell is greater than the number of antennas of a BS. However, in the case of the future communication system to which the massive MIMO is applied, since a BS has a number of antennas, the effect of scheduling may be inadequate.

Meanwhile, the non-orthogonal multiple access (NOMA) scheme can be applied as an alternative of the conventional orthogonal multiple access scheme.

Referring to FIGS. 7 (a) and (b), FIG. 7(a) shows an example based on the orthogonal multiple access scheme, and FIG. 7(b) shows an example based on the NOMA scheme. Specifically, the orthogonal multiple access scheme is the scheme for allocating independent resources to each UE to mitigate interference between UEs as described above. Unlike the orthogonal multiple access scheme, the NOMA scheme may be a scheme in which the same frequency-time resources corresponding to as a specific resource region are allocated to a plurality of UEs and in addition to that, interference is cancelled using an interference cancellation receiver with a predetermined power ratio. That is, it is expected that the NOMA scheme will be widely used because a wide bandwidth can be obtained.

In detail, according to the NOMA scheme, signals overlap with each other on the same space resources based on superposition coding and then, the overlapping signals are transmitted to UEs. Thus, the number of UEs receiving signals may be greater than a radio channel rank.

However, regarding the NOMA scheme, even when a UE uses a plurality of antennas, a signal may be transmitted to the UE using a single beam. In this case, if signal transmission is performed based on superposition of a plurality of UEs in a single beam space, the number of streams provided to the UE cannot be greater than one. Thus, although overall transmission capacity of the network may increase, transmission capacity per UE may be limited to a stream number.

Hereinafter, as a signal transmission and reception method based on the NOMA scheme, a method for transmitting multiple streams to a UE using multiple beams in consideration of the above-described stream number will be described.

Figure 8:
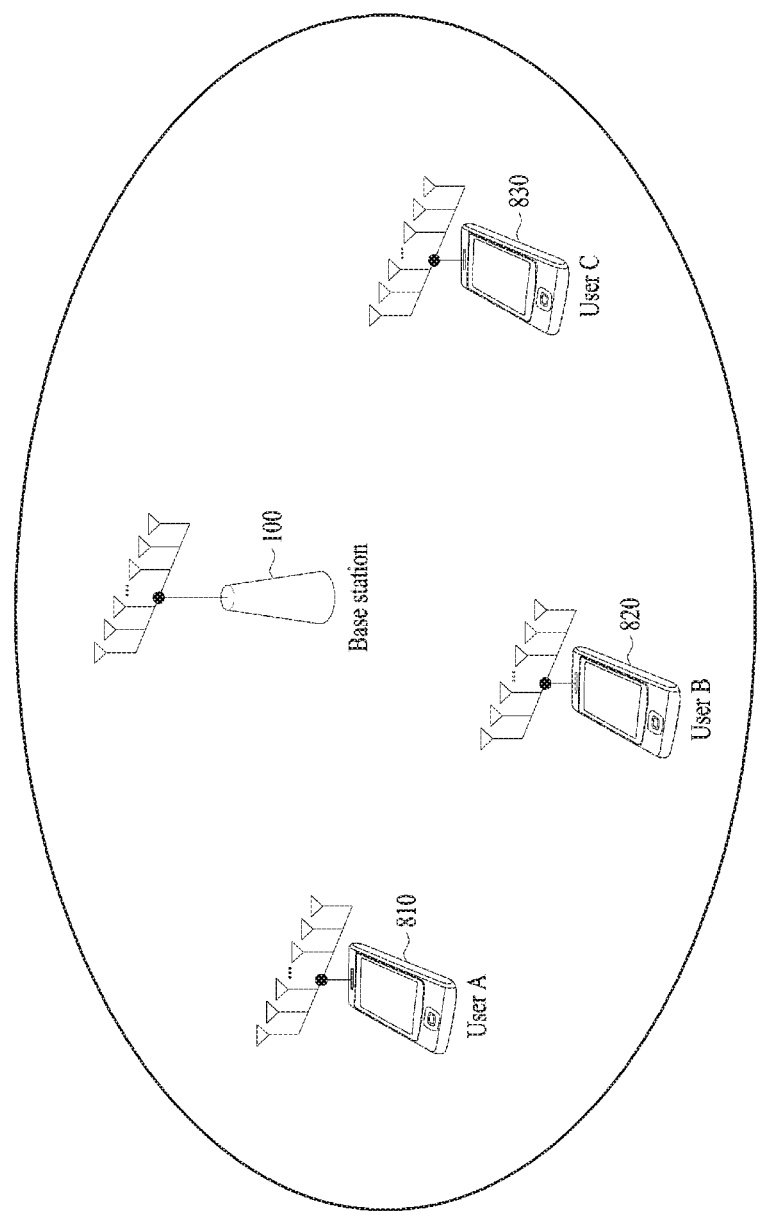
FIG. 8 is a diagram illustrating a base station and user equipments, each of which has multiple antennas.

FIG. 8 is a diagram illustrating a base station and user equipments, each of which has multiple antennas.

As described above, a wireless communication system (e.g., 3GPP LTE and LTE-A systems) may include a base station (BS) or eNodeB (eNB) connected to an infrastructure and users or user equipments (UEs) that dispersively exist.

Referring to FIG. 8, a BS 100 and a plurality of UEs 810, 820, and 830 may have multiple antennas. For example, it is possible to consider a wireless communication system in which the BS 100 has L antennas and K UEs 810, 820, and 830 have M antennas. In this case, the BS 100 may be configured to maximize downlink radio transmission capacity in consideration of the situation that there are a plurality of UEs 810, 820, and 830 and each of the plurality of UEs have multiple antennas.

In this case, for example, the above-mentioned antenna may mean the number of paths capable of performing transmission or reception, which are controlled by a baseband processor of the BS 100 or each UE, rather than a physical antenna unit. In addition, even when the number of physical antenna units such as a hybrid array antenna is different from the number of paths that can be controlled by a baseband processor, the following configurations can be applied. Although the present invention is described on the assumption that they are equal to each other for convenience of description, the invention is not limited thereto.

Figure 9:
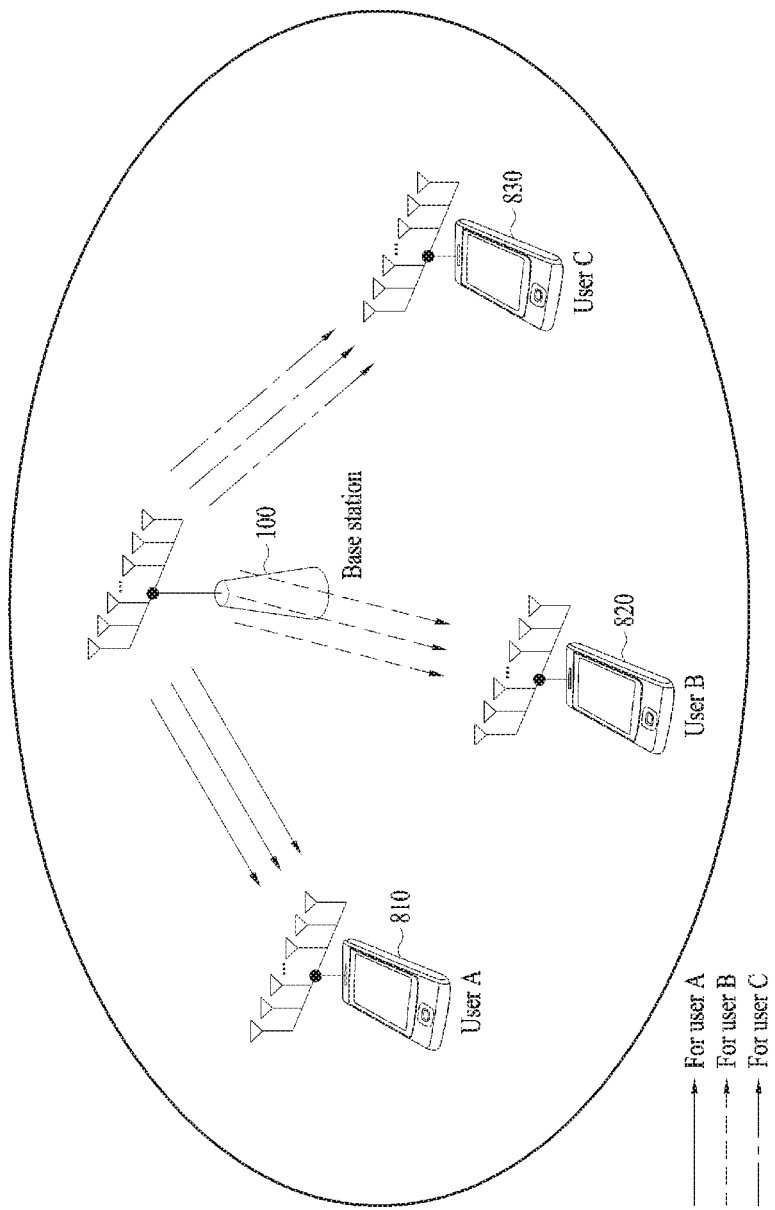
FIG. 9 is a diagram illustrating a method in which a base station transmits signals to user equipments based on an orthogonal multiple access scheme.

FIG. 9 is a diagram illustrating a method in which a BS transmits signals to UEs based on an orthogonal multiple access scheme.

Specifically, FIG. 9 shows a method in which the BS 100 performs downlink radio transmission for UEs based on the above-described orthogonal multiple access scheme.

In this case, for example, the BS 100 may have the L antennas, and the K UEs 810, 820, and 830 may have the M antennas as described above. In this case, the BS 100 may generate L transmission beams and then allocate up to M beams among the generated L transmission beams to the K UEs.

In this case, for example, referring to FIG. 9, the BS may create 9 transmission beams and then allocate three beams to each of three users: user A (or UE A 810), user B (or UE B 820), and user C (or UE C 830) to perform the downlink transmission. In this case, not only can the BS simultaneously transmit information signals to the plurality of UEs 810, 820, and 830 by including the information signals in the beams but also the UEs 810, 820, and 830 can simultaneously receive multiple beams according to their desired quality-of-service.

In this case, for example, the BS can obtain the spatial multiplexing effect capable of simultaneously transmitting difference signals to UEs using multiple antennas. In addition, for example, the BS can also obtain the diversity effect capable of reliably transmitting one signal using multiple antennas. That is, the BS can simultaneously transmit signals to a UE(s) through a plurality of beams based on the number of antennas.

Figure 10:
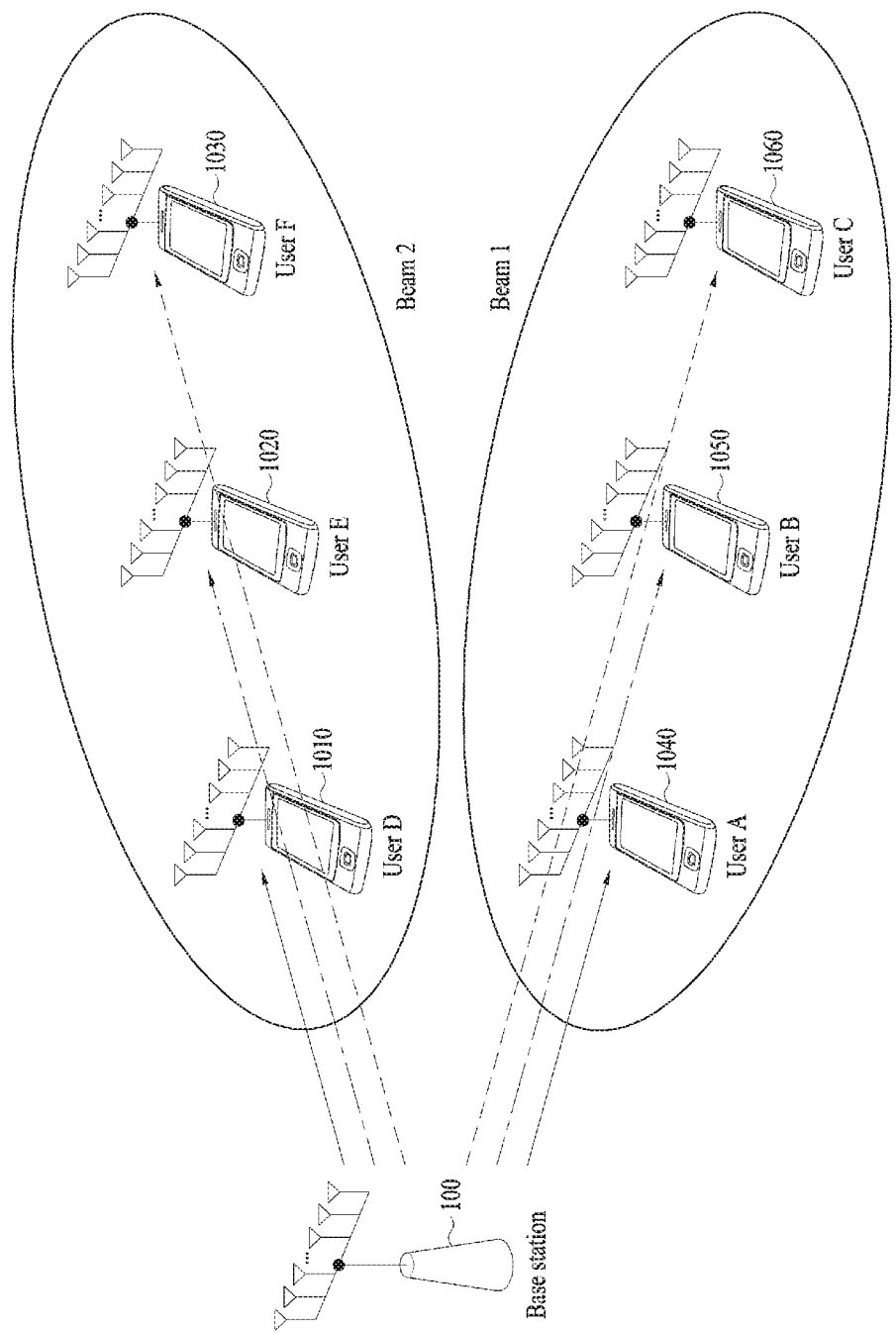
FIG. 10 is a diagram illustrating a method in which a base station transmits signals to user equipments based on the NOMA scheme.

FIG. 10 is a diagram illustrating a method in which a BS transmits signals to UEs based on the NOMA scheme.

When a signal is transmitted to a UE based on the NOMA scheme in the wireless communication system, only a single transmission beam is transmitted to the UE unlike the above description.

In detail, the BS 100 may create the L transmission beams as described above. According to the NOMA scheme, one or more information signal can be included in one transmission beam and then transmitted unlike the orthogonal multiple access scheme.

For example, referring to FIG. 10, the BS 100 may create two transmission beams: transmission beams 1 and 2. In this case, the BS 100 may transmit signals for user A (or UE A 1010), user B (or UE B 1020), and user C (or UE C 1030) through the transmission beam 1. In addition, the BS 100 may transmit signals for user D (or UE D 1040), user E (or UE E 1050), and user F (or UE F 1060) through the transmission beam 2.

In this case, since each UE receives signals for other UEs together, each UE can use a multi-user receiver to decode its own signal. For example, each of the UEs A 1010, B 1020, and C 1030 may receive a signal including information signals for the UEs A 1010, B 1020, and C 1030 through the transmission beam 1. In this case, the UE A 1010 may decode its signal by discarding the information signals for the UEs B 1020 and C 1030. In addition, the UE B 1020 may decode its signal by decoding and eliminating the signal transmitted to the UE A 1010 and considering the signal for the UE C 1030 as interference. Moreover, the UE C 1030 may decode its signal by decoding and eliminating the signals transmitted to the UE A 1010 and UE B 1020.

That is, since in the NOMA scheme, signals are transmitted using a superposition coding scheme, each UE can obtain a signal allocated to itself by decoding and eliminating other signals. In this case, according to the above-described scheme, a BS may obtain high transmission capacity with low calculation complexity compared to the DPC scheme. However, in this scheme, since one transmission beam is allocated to a single UE, transmission capacity per UE or reliability may be decreased. Therefore, a method for improving transmission capacity and reliability is required for the next-generation communication system where massive multimedia or real-time data transmission and reception is performed.

Specifically, a method for providing multiple streams to a UE based on multiple beams while using the NOMA scheme needs to be developed.

Referring to Table 1 below, in the legacy system such as the LTE system, signals can be transmitted to UEs based on the orthogonal multiple access scheme. In this case, among a plurality of beams transmitted from a BS, one beam may include a single piece of information. However, the plurality of beams transmitted from the BS may be transmitted to one UE. That is, since the UE can receive the plurality of beams each including a single piece of information, the UE has high throughput. However, the total throughput may not be high because one beam includes a single piece of information.

On the other hand, in the case of the NOMA scheme based on a single beam, a plurality of pieces of information can be included in a single beam, but a single UE can be allocated a single beam. That is, the total throughput may be high because a plurality of pieces of information can be included in a single beam. However, from the perspective of a UE, since only a single beam is received, the UE may not have high throughput.

Meanwhile, when a BS transmits a signal to a UE according to the NOMA scheme based on a plurality of beams, a single beam can include a plurality of pieces of information. Thus, the total throughput may be increased. In addition, since a single UE can be allocated a plurality of beams, the UE may have high throughput. Therefore, particular embodiments in which a BS performs signal transmission using the NOMA scheme based on a plurality of beams will be described.

TABLE 1

| LTE-like transmission | Single-beam based NOMA | Multi-beam based NOMA |
| --- | --- | --- |
| one information-bearing signal on a spatial beam | Multiple information-bearing signals on a spatial beam | Multiple information-bearing signals on a spatial beam |
| Multiple beams per a uses | Single beam per a user | Multiple beams per a user |
| Good per-user throughput | Bad per-user throughput | Good per-user throughput |
| Bad sum throughput | Good sum throughput | Good sum throughput |

Figure 11:
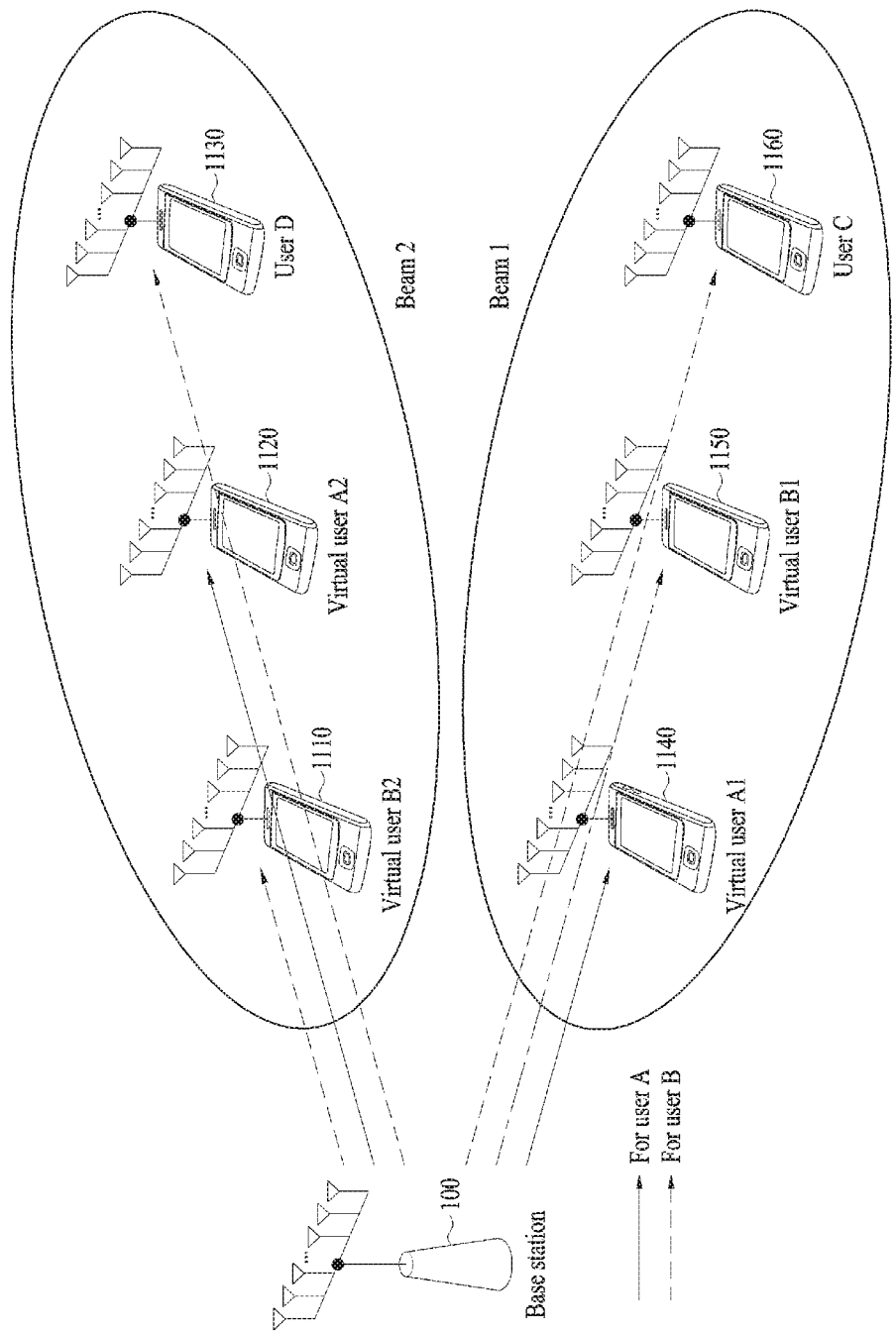
FIG. 11 is a diagram illustrating a method in which a base station transmits signals to user equipments using multiple beams based on the NOMA scheme.

FIG. 11 is a diagram illustrating a method in which a BS transmits signals to UEs using multiple beams based on the NOMA scheme.

Referring to FIG. 11, the BS can increase radio transmission capacity by transmitting a plurality of beams to UEs according to the NOMA scheme. In this case, the method may be the multi-beam based NOMA scheme. According to the multi-beam based NOMA scheme, the BS 100 may divide each UE into virtual UEs, create multiple transmission beams, and then allocate a single beam to each virtual user.

In detail, the BS 100 can estimate channel information by receiving a reference signal from a UE and then create a beam to be transmitted to the UE based on the estimated channel information. In this case, the BS 100 can divide the UE into a plurality of virtual UEs and then allocate a single beam to each of the individual virtual UEs. The single beam transmitted to each of the individual virtual UEs may be a beam transmitted based on the NOMA scheme. That is, the UE may increase transmission capacity by receiving multiple beams transmitted to the individual virtual UEs. In addition, since each beam may be a beam transmitted based on the NOMA scheme, the total transmission capacity may be increased.

For example, referring to FIG. 11, UE A can be divided into virtual UE A1 1140 and virtual UE A2 1120, and UE B can be divided into virtual UE B1 1150 and virtual UE B2 1110. In this case, the BS 100 may transmit transmission beam 1 by including information for the virtual UE B2 1110, the virtual UE A1 1120, and UE D 1130 in the transmission beam 1. In addition, the BS 100 may transmit transmission beam 2 by including information for the virtual UE A1 1140, the virtual UE B1 1150, and UE C 1160 in the transmission beam 2. By doing so, the UE A can receive information through the transmission beams 1 and 2, and the UE B can also receive information through the transmission beams 1 and 2. Moreover, since the BS 100 can include a plurality of pieces of information in a single transmission beam and then transmit the single beam, the transmission capacity can also be increased.

FIG. 12 is a diagram illustrating a method for generating virtual UEs.

As described above, a BS can generate virtual UEs for a UE. In this case, a channel matrix of UE A, which is estimated by the BS based on a reference signal, may be $H_A$ with a size of M×L. In this case, the BS may generate the virtual UEs by projecting the channel matrix $H_A$ onto Q normalized vectors $t_1, \ldots, t_Q$ (where Q≤M). In this case, for example, normalization of a vector may mean to make a 2-norm of the vector be 1. A channel matrix of a $j^{th}$ virtual UE of the UE A generated by the BS can be expressed as shown in Equation 12.

$$H_{A,j} = t_j^H H_A \quad \text{[Equation 12]}$$

In this case, the channel matrix $H_{A,j}$ of the $j^{th}$ virtual UE may have a size of 1×L. Thus, a virtual UE can be considered as one UE having a single antenna.

In this case, for example, the vectors for generating the virtual UEs, $t_1, \ldots, t_Q$ may be generated from the channel matrix $H_A$ of the UE A. That is, when the singular value decomposition (SVD) is performed on the channel matrix of the UE A, Equation 13 below can be obtained.

$$H_A = U_A D_A V_A^H \quad \text{[Equation 13]}$$

In Equation 13, $U_A$ may be an M×M unitary matrix, and $V_A$ may be an L×L unitary matrix. In addition, $D_A$ may be an M×L diagonal matrix, where an $i^{th}$ diagonal component is a singular value $\lambda_i$ and $\lambda_i \geq \lambda_{i+1}$.

Thus, the vectors for generating the virtual UEs, $t_1, \ldots, t_Q$ can be obtained from Q column vectors of $U_A$ corresponding to the highest Q singular values $\lambda_1, \lambda_2, \ldots, \lambda_Q$.

However, the above-described method may be a merely example for generating the vectors for generating the virtual UEs, $t_1, \ldots, t_Q$, and the vectors may be created in a different way according to second-order statistical characteristics of the channel matrix $_{HA}$ of the UE A. In addition, the invention is not limited thereto.

Moreover, an M×M covariance matrix of the channel matrix of the UE A may be defined as $R_A = E[H_A H_A^H]$. When the SVD is performed on the covariance matrix, Equation 14 can be obtained.

$$R_A = \overline{U}_A \overline{D}_A \overline{U}_A^H \quad \text{[Equation 14]}$$

In Equation 14, $\overline{U}_A$ is an M×M unitary matrix, $\overline{D}_A = \text{diag}(\overline{\lambda}_1, \overline{\lambda}_2, \ldots, \overline{\lambda}_M)$ is an M×M diagonal matrix, where its singular value satisfies the condition of $\overline{\lambda}_i \geq \overline{\lambda}_{i+1}$. Thus, the vectors for generating the virtual UEs, $t_1, \ldots, t_Q$ can be obtained from Q column vectors of $\overline{U}_A$ corresponding to the highest Q singular values $\overline{\lambda}_1, \overline{\lambda}_2, \ldots, \overline{\lambda}_Q$ FIG. 13 is a diagram illustrating a method for generating a virtual user equipment set.

Referring to FIGS. 13 (*a*) and (*b*), a BS can configure a virtual UE set using channel information $\{H_{A,j}\}$ of virtual UEs. In this case, for example, the virtual UE set may be determined based on similarity between channels. That is, virtual UEs belonging to the same virtual UE set may have channel similarity equal to or lower than a threshold. In this case, the threshold may be a critical value and have a certain amount of error. For example, channel similarity between channel vectors u and v can be determined according to Equation 15 below.

$$\theta = \cos^{-1}\left(\frac{u^H v}{\|u\|\|v\|}\right) \quad \text{[Equation 15]}$$

In this case, when the channel similarity based on Equation 15 is equal to or lower than a predetermined value (threshold), virtual UEs can be grouped as the same virtual UE set.

For example, referring to FIG. 13 (*a*), UE A may be divided into four virtual UEs, and UE B may be divided into five virtual UEs. In this case, by using channel similarity of individual virtual UEs, virtual UEs (A,1), (A,4), (B,1), (B,3), and (B,4) may be grouped as set 1, and virtual UEs (A,2), (A,3), (B,2), and (B,5) may be grouped as set 2.

In addition, for example, the virtual UE set can be configured using channel characteristics and similarity with a specific vector. For example, referring to FIG. 13 (*b*), assuming that two specific vectors are $f_1$ and $f_2$, by using similarity therebetween, virtual UEs (A,1), (A,3), (B,1), and (B,3) may be grouped as set 1, and virtual UEs (A,2), (A,4), (B,2), (B,4), and (B,5) may be grouped as set 2.

In this case, the above-described classification method for virtual UE sets may be a merely example, and the virtual UE sets can be classified in a different manner.

Figure 14:
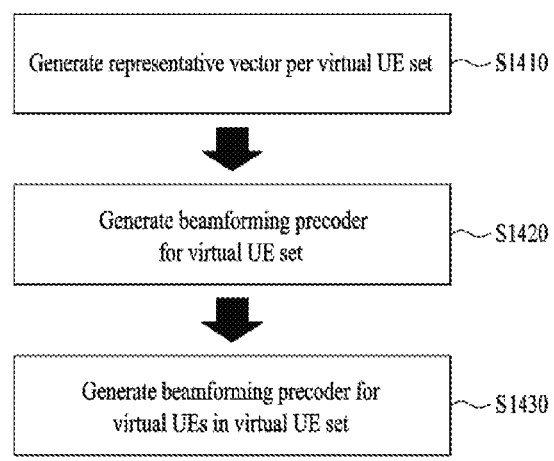
FIG. 14 is a flowchart illustrating a method for generating a representative vector and precoder based on a virtual user equipment set.

FIG. 14 is a flowchart illustrating a method for generating a representative vector and precoder based on a virtual user equipment set.

Referring to FIG. 14, a representative vector for each virtual UE set can be generated [S1410]. Thereafter, a beamforming precoder for virtual UE sets is generated [S1420], and then a beamforming precoder for virtual UEs included in each virtual UE set is generated [S1430].

In detail, referring to FIG. 14, the representative vector for each virtual UE set can be generated, and the beamforming precoder for the virtual UE sets and the beamforming precoder for the virtual UEs included in each virtual UE set can be generated. In this case, the representative vector is a vector that represents channels of UEs included in the corresponding virtual UE set. For example, a representative vector of virtual UE set 1 can be calculated according to Equation 16 below.

$$H_1^{rep} = \frac{1}{U_1} \sum_{i \in U_1} H_i \quad \text{[Equation 16]}$$

$$[H_1^{rep}]_{ij} = |U_1| \sqrt{\prod_{i \in U_1} [H_i]_{ij}} \quad \text{[Equation 17]}$$

In Equation 17, $[X]_{ij}$ may denote an $(i, j)^{th}$ element of a matrix X.

As another example, the representative vector of the virtual UE set 1 can be calculated according to Equation 18 below.

$$[H_1^{rep}]_{ij} = \left(\sum_{i \in U_1} [H_i]_{ij}^{-1}\right)^{-1} \quad \text{[Equation 18]}$$

That is, not only can representative vectors for virtual UE sets be generated in various ways but also the invention is not limited to the aforementioned embodiment. Thereafter, the BS can calculate a beamforming vector from the generated representative vectors for the virtual UE sets. In this case, for example, the beamforming vector may be a vector for maximizing a sum-rate of virtual UEs. In addition, for example, the beamforming vector may be a vector designed to maximize the minimum value among rates of the virtual UEs.

For example, the beamforming vector may be designed to cancel interference between the virtual UEs.

In this case, assuming that Q representative vectors are $H_1^{rep}$, $H_2^{rep}$, . . . , $H_Q^{rep}$, a beamforming precoder for interference cancellation can be expressed as shown in Equation 19.

$$F^{cf}=H_{ref}^{H}(H_{ref}H_{ref}^{H})^{-1} \quad \text{[Equation 19]}$$

In Equation 19, the equation of Hrep=$[(H_1^{rep})^H, (H_2^{rep})^H, \ldots, (H_Q^{rep})^H]^H$ may be satisfied.

For example, the beamforming precoder may be a precoder designed to maximize the sum-rate of the virtual UEs. In addition, the beamforming precoder can be generated as an optimized precoder according to Equation 20 below.

$$F^{sum-rate} = \underset{F:tr(FF^H)\leq P}{\operatorname{argmax}} \ \log\det(I + \gamma H_{rep}FF^H H_{rep}) \quad \text{[Equation 20]}$$

However, Equations for beamforming may be a merely example, and the beamforming precoder can be generated in various ways.

As another example, to mitigate interference between virtual UEs related to a specific UE, a precoder for cancelling interference $H_A^{eff}$ can be used. In this case, assuming that the above-mentioned beamforming matrix is F, the UE A can obtain an effective channel according to Equation 21 below.

$$\overline{H_A^{eff}=H_AF} \quad \text{[Equation 21]}$$

In this case, if all the virtual UEs for the UE A belong to different virtual UE sets and the precoder for cancelling the interference between the virtual UEs shown in Equation 19 is used, column vectors of $H_A^{eff}$ may be orthogonal to each other.

However, if the above-described conditions are not satisfied, i.e., in a normal case, the column vectors of $H_A^{eff}$ are not orthogonal to each other. That is, virtual UEs related to a specific UE may cause interference to each other. In this case, the above-described precoder for interference cancellation can be obtained according to Equation 20. In this case, if the SVD is performed on $H_A^{eff}$, it can be changed as shown in Equation 22.

$$H_A^{eff}=U_A^{eff}D_A^{eff}(V_A^{eff})^H \quad \text{[Equation 22]}$$

In Equation 22, $U_A^{eff}$ and $V_A^{eff}$ may be unitary matrices, and $D_A^{eff}$ may be a diagonal matrix. In addition, when the interference cancellation precoder for the UE A is assumed to be $W_A$, it can be expressed as shown in Equation 23.

$$W_A=V_A^{eff} \quad \text{[Equation 23]}$$

$$T = F \begin{bmatrix} W_A & 0 & L & 0 \\ 0 & W_B & & M \\ M & & O & 0 \\ 0 & L & 0 & W_Q \end{bmatrix} \quad \text{[Equation 24]}$$

That is, a representative vector for each virtual UE, a precoder for virtual UE sets, and a beamforming precoder for virtual UEs included in each virtual UE can be generated. Thereafter, optimal power can be allocated for each virtual UE using the generated precoder.

Figure 15:
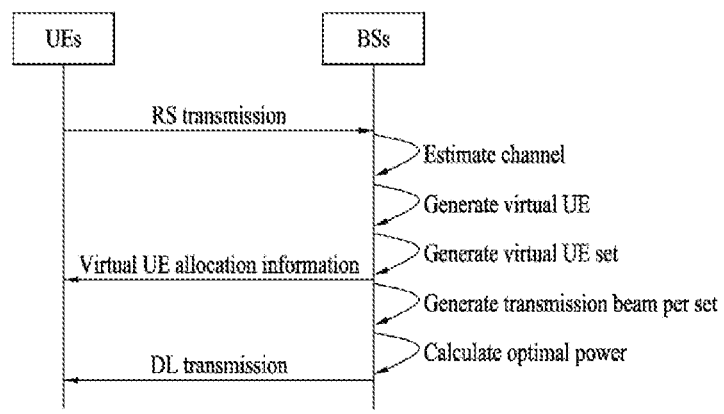
FIG. 15 is a flowchart illustrating a method for transmitting signals using multiple beams based on the NOMA scheme.

FIG. 15 is a flowchart illustrating a method for transmitting signals using multiple beams based on the NOMA scheme.

Referring to FIG. 15, a BS may receive a reference signal from a UE and then estimate a channel based on the received reference signal. Thereafter, the BS may generate virtual UEs for the UE based on the estimated channel and then generate a virtual UE set using the generated virtual UEs. In this case, for example, the BS may feedback allocation information for the virtual UEs to the UE. In this case, for example, the allocation information for the virtual UEs may include information on the virtual UE set including the virtual UEs or information on the number of virtual UE. However, the invention is not limited thereto. Thereafter, the BS creates a transmission beam for each generated virtual UE set and then calculate optimal power for each virtual UE. Finally, the BS can transmit a downlink signal to the UE.

Figure 16:
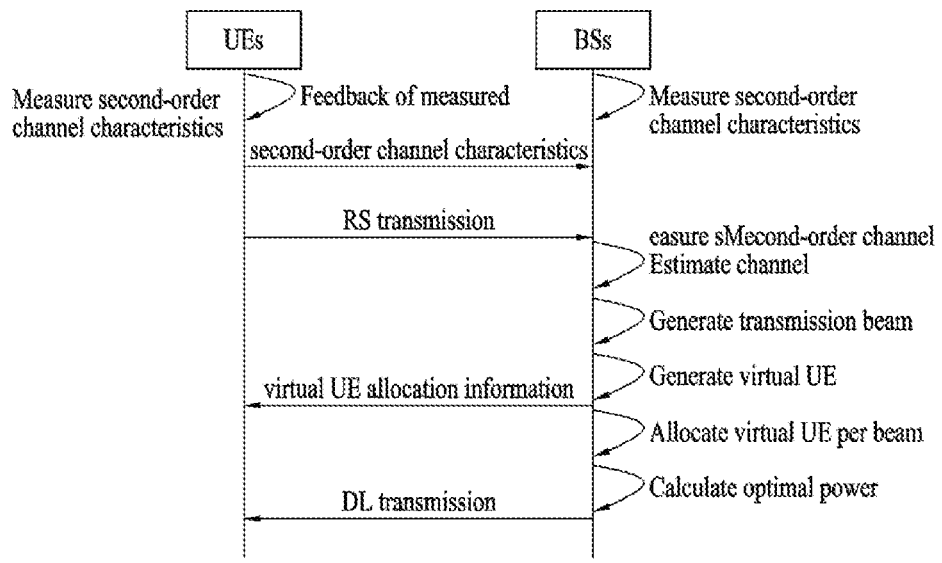
FIG. 16 is a flowchart illustrating a method for transmitting signals using second-order channel characteristics based on the NOMA scheme.

FIG. 16 is a flowchart illustrating a method for transmitting signals using second-order channel characteristics based on the NOMA scheme.

Referring to FIG. 16, a BS can perform signal transmission based on second-order channel characteristics. In detail, the BS may directly measure the second-order channel characteristics. In addition, for example, the BS may obtain the second-order channel characteristics by receiving feedback of the second-order channel characteristics measured by a UE. Thereafter, the BS can perform channel estimation by receiving a reference signal. In this case, for example, the BS can transmit a signal using both channel estimation information obtained from the reference signal and information on the second-order channel characteristics.

In this case, for example, the BS can create transmission beams using both of the received channel estimation information and the second-order channel characteristics information. In other words, the BS may generate the transmission beams using the channel information before generating virtual UEs for the UE. Thereafter, the BS may generate the virtual UEs for the UE. The BS may respectively allocate the transmission beams to the virtual UEs by considering properties of the transmission beams. In this case, the BS may feedback allocation information for the virtual UEs to the UE as described above. Thereafter, the BS may calculate optimal power for each virtual UE and then transmit signals in downlink. In other words, the BS can generate and allocate the virtual UEs after generating the transmission beams using the second-order channel characteristics information, and by doing so, higher performance can be achieved.

Figure 17:
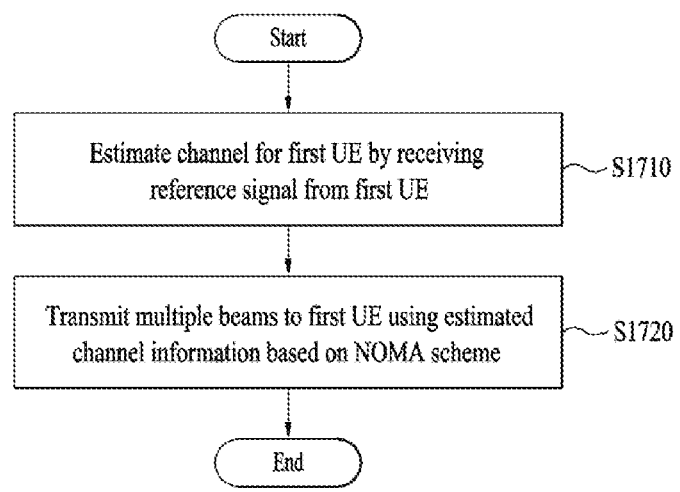
FIG. 17 is a flowchart according to an embodiment of the present invention.

FIG. 17 is a flowchart in accordance with an embodiment of the present invention.

A BS can estimate a channel for a first UE by receiving a reference signal from the first UE [S1710]. Subsequently, the BS can transmit a plurality of beams to the first UE using the estimated channel information based on the NOMA scheme [S1720].

In this case, when the BS transmits the plurality of beams to the first UE based on the NOMA scheme, the BS may generate a plurality of virtual UEs for the first UE as described with reference to FIGS. 8 to 16. The BS may include a first virtual UE among the generated plurality of virtual UEs in a first virtual UE set. The BS may transmit information on the first virtual UE set through a first beam.

In addition, the BS may include a second virtual UE among the plurality of virtual UEs in a second virtual UE set and then transmit information on the virtual UE set through a second beam. That is, the BS may generate the plurality of virtual UEs for the UE, allocate each of the plurality of virtual UEs to a virtual UE set, and then transmit information on each virtual set through a different beam. In this case, the plurality of virtual UEs for the UE may be one or more virtual UEs, and the invention is not limited to the above-described embodiment. Further, one or more virtual UE sets may be generated, and the invention is not also limited thereto.

Figure 18:
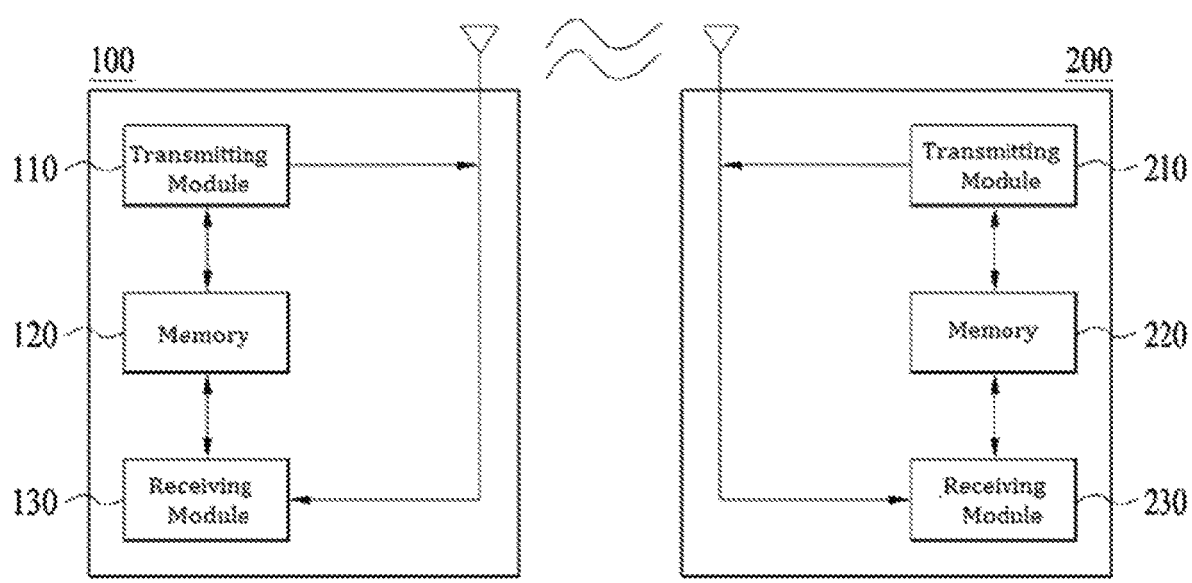
FIG. 18 is a block diagram illustrating a base station device and user equipment device according to an embodiment of the present invention.

FIG. 18 is a block diagram illustrating a BS device and UE device according to an embodiment of the present invention. A wireless communication system may include a BS device 100 and a UE device 200.

In this case, the BS device 100 may include a transmitting module 110 configured to transmit a radio signal, a receiving module 130 configured to receive a radio signal, and a processor 120 for controlling the transmitting and receiving modules 110 and 130. In addition, the BS device 100 may perform communication with an external device using the transmitting and receiving modules 110 and 130. In this case, the external device may be a UE device. That is, the BS device 100 may be a device capable of communicating with the UE device 200 as the external device, but the present invention is not limited thereto.

In addition, the UE device 200 may include a transmitting module 210 configured to transmit a radio signal, a receiving module 230 configured to receive a radio signal, and a processor 220 for controlling the transmitting and receiving modules 210 and 230. In this case, the UE device 200 may perform communication with a BS using the transmitting and receiving modules 210 and 230. That is, the UE device 200 may be a device capable of communicating with the BS in the wireless communication system, but the present invention is not limited thereto.

In this case, for example, the processor 120 of the BS 100 may estimate channel information on a first UE by receiving a reference signal from the first UE. In this case, the processor 120 of the BS 100 may receive the reference signal using the receiving module 130. In addition, the processor 120 of the BS 100 may a plurality of beams to the first UE using the estimated channel information based on the NOMA scheme. In this case, the processor 120 of the BS 100 may transmit the plurality of beams using the transmitting module 110. In this case, when the BS intends to transmit the plurality of beams to the first UE based on the NOMA scheme, the BS may generate a plurality of virtual UEs for the first UE. Thereafter, the BS may allocate a signal for a first virtual UE among the plurality of virtual UEs to a first beam and then transmit the first beam. Similarly, the BS may allocate a signal for a second virtual UE among the plurality of virtual UEs to a second beam and then transmit the second beam. In other words, the BS can generate the plurality of virtual UEs for the UE and then transmit signals for the generated plurality of virtual UEs by including the signals in different beams as described above.

In addition, although the above-described configurations have been arranged with reference to the BS, the configurations can be applied to the UE in the same manner.

In detail, the UE may transmit channel estimation information to the BS after being allocated the reference signal by the BS and then receive the plurality of beams transmitted from the BS based on the virtual UEs. That is, the wireless communication system may be a system where the UE and BS can cooperate with each other, but the present invention is not limited to the above-described embodiment.

The embodiments of the present invention mentioned in the foregoing description can be implemented using various means. For instance, the embodiments of the present invention can be implemented using hardware, firmware, software and/or any combinations thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

The preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

In addition, both an apparatus invention and a method invention are explained in the present specification, and if necessary, the explanation on both the inventions can be complementally applied.

INDUSTRIAL APPLICABILITY

Although a method for transmitting a signal using multiple beams based on a non-orthogonal multiple access (NOMA) scheme in a wireless communication system and device for the same are mainly described with reference to examples applied to the 3GPP LTE system, the method and device can be applied to various wireless communication systems as well as the 3GPP LTE system.

What is claimed is:

1. A method for transmitting a signal to a user equipment (UE) by a base station (BS) supporting multi-user multi-stream, the method comprising:
estimating channel information for a first UE by receiving a reference signal from the first UE; and
transmitting a plurality of beams to the first UE using the estimated channel information based on a non-orthogonal multiple access (NOMA) scheme,
wherein a plurality of virtual UEs for the first UE are generated when the plurality of beams are transmitted to the first UE based on the NOMA scheme, and
wherein a signal for a first virtual UE among the plurality of virtual UEs is allocated to a first beam and then transmitted and a signal for a second virtual UE among the plurality of virtual UE is allocated to a second beam and then transmitted.

2. The method of claim 1, wherein the first virtual UE is included in a first virtual UE set and the first beam is a transmission beam corresponding to the first virtual UE set, and
wherein the second virtual UE is included in a second virtual UE set and the second beam is a transmission beam corresponding to the second virtual UE set.

3. The method of claim 2, further comprising:
estimating a channel for a second UE by receiving a reference signal from the second UE; and
transmitting the plurality of beams to the second UE using the estimated channel based on the NOMA scheme,
wherein a plurality of virtual UEs for the second UE are generated when the plurality of beams are transmitted to the second UE based on the NOMA scheme,
wherein a third virtual UE among the plurality of virtual UEs for the second UE is included in the first virtual UE set and a signal for the third virtual UE is further allocated to the first beam and then transmitted, and
wherein a fourth virtual UE among the plurality of virtual UEs for the second UE is included in the second virtual UE set and a signal for the fourth virtual UE is further allocated to the second beam and then transmitted.

4. The method of claim 3, wherein virtual UEs included in one virtual UE set are virtual UEs having channel similarity equal to or lower than a first threshold.

5. The method of claim 3, further comprising generating representative vectors for the virtual UE sets, respectively.

6. The method of claim 5, comprising generating a beamforming precoder using the representative vectors, wherein the beamforming precoder is a precoder for cancelling interference associated with virtual UEs included in each virtual UE set.

7. The method of claim 2, further comprising feeding back, to the first UE, allocation information for the first and second virtual UEs.

8. The method of claim 1, further comprising measuring second-order characteristics of a channel.

9. The method of claim 8, wherein when the second-order characteristics of the channel is measured, the plurality of beams are transmitted to the first UE using the channel information estimated from the reference signal together with the measured second-order characteristics of the channel based on the NOMA scheme.

10. The method of claim 9, wherein when the plurality of beams are transmitted to the first UE based on the NOMA scheme, the first and second beams are first generated based on the measured second-order characteristics of the channel, and then based on characteristics of the generated first and second beams, the first virtual UE is allocated to the first beam and the second virtual UE is allocated to the second beam.

11. A base station (BS) device supporting multi-user multi-stream, the BS device comprising:
a reception module configured to receive information from an external device;
a transmitting module configured to transmit information to the external device; and
a processor controlling the receiving and transmitting modules,
wherein the processor is configured to:
estimate channel information for a first user equipment (UE) by receiving a reference signal from the first UE; and
transmit a plurality of beams to the first UE using the estimated channel information based on a non-orthogonal multiple access (NOMA) scheme,
wherein a plurality of virtual UEs for the first UE are generated when the plurality of beams are transmitted to the first UE based on the NOMA scheme, and
wherein a signal for a first virtual UE among the plurality of virtual UEs is allocated to a first beam and then transmitted and a signal for a second virtual UE among the plurality of virtual UE is allocated to a second beam and then transmitted.

12. The BS device of claim 11, wherein the first virtual UE is included in a first virtual UE set and the first beam is a transmission beam corresponding to the first virtual UE set, and wherein the second virtual UE is included in a second virtual UE set and the second beam is a transmission beam corresponding to the second virtual UE set.

13. The BS device of claim 12, wherein the processor is further configured to:
estimate channel information for a second UE by receiving a reference signal from the second UE; and
transmit the plurality of beams to the second UE using the estimated channel information based on the NOMA scheme,
wherein a plurality of virtual UEs for the second UE are generated when the plurality of beams are transmitted to the second UE based on the NOMA scheme,
wherein a third virtual UE among the plurality of virtual UEs for the second UE is included in the first virtual UE set and a signal for the third virtual UE is further allocated to the first beam and then transmitted, and
wherein a fourth virtual UE among the plurality of virtual UEs for the second UE is included in the second virtual UE set and a signal for the fourth virtual UE is further allocated to the second beam and then transmitted.

14. The BS device of claim 12, wherein virtual UEs included in each virtual UE set are virtual UEs having channel similarity equal to or lower than a first threshold.

15. The BS device of claim 12, wherein the processor is configured to generate representative vectors for the virtual UE sets, respectively.

* * * * *